US011661059B2

(12) United States Patent
Perrin et al.

(10) Patent No.: US 11,661,059 B2
(45) Date of Patent: May 30, 2023

(54) METHOD AND SYSTEM FOR MODIFYING THE SPEED OF A VEHICLE DEPENDING ON THE VALIDATION OF ITS CALCULATED LOCALIZATION FIELD

(71) Applicant: EASYMILE, Toulouse (FR)

(72) Inventors: Benoit Perrin, Toulouse (FR); Cyril Roussillon, Colomiers (FR); Arnaud Dumerat, Toulouse (FR); Manon Monnerie, Toulouse (FR); Arnaud Telinge, Toulouse (FR)

(73) Assignee: EASYMILE, Toulouse (FR)

( * ) Notice: Subject to any disclaimer, the term of this patent is extended or adjusted under 35 U.S.C. 154(b) by 78 days.

(21) Appl. No.: 16/868,177

(22) Filed: May 6, 2020

(65) Prior Publication Data

US 2020/0353923 A1   Nov. 12, 2020

(30) Foreign Application Priority Data

May 6, 2019 (EP) .................................... 19315032

(51) Int. Cl.
*B60W 30/14* (2006.01)
*B60W 40/105* (2012.01)
*B60W 50/08* (2020.01)

(52) U.S. Cl.
CPC ........ *B60W 30/146* (2013.01); *B60W 40/105* (2013.01); *B60W 50/085* (2013.01)

(58) Field of Classification Search
CPC . B60W 30/146; B60W 40/105; B60W 50/085
See application file for complete search history.

(56) References Cited

U.S. PATENT DOCUMENTS

| 7,073,621 B2 * | 7/2006 | Koibuchi ................ B60T 8/175 180/421 |
| 9,855,894 B1 * | 1/2018 | Khorasani .......... G06K 9/00805 |

(Continued)

FOREIGN PATENT DOCUMENTS

| DE | 102016212196 A1 * | 1/2018 | ........... H04L 9/3247 |
| WO | 2018/086122 A1 | 5/2018 | |
| WO | 2018/086133 A1 | 5/2018 | |

OTHER PUBLICATIONS

Machine translation of DE-102016212196-A1 (Year: 2018).*
European Search Report with regard to the counterpad Patent Application No. EP 19315032.3 completed Nov. 12, 2019.

*Primary Examiner* — Jeff A Burke
*Assistant Examiner* — Mohamad O El Sayah
(74) *Attorney, Agent, or Firm* — BCF LLP

(57) ABSTRACT

A method and system for validating the calculated localization (15) of a vehicle are devised. The vehicle (1) is equipped with P independent localization data sources (2-8), with P higher than or equal to 2. The method and system involve the step of comparing data provided by each one of a subset of M, with M lower than or equal to P, of the independent localization data sources with the calculated localization, by correlating an independent localization data source among the subset M if it is above a predetermined Reliability Threshold, and the distance between the data it provides and the calculated localization is lower than a predetermined Compatibility Threshold, and disregarding an independent localization data source among the subset M if either it is below the predetermined Reliability Threshold, or the distance between the data it provides and the calculated localization is higher than the predetermined Compatibility Threshold, and the step of modifying the speed of the vehicle (1) depending on the number of correlated independ- (Continued)

dent localization data sources among the subset M relative to a predetermined Voting Threshold.

13 Claims, 7 Drawing Sheets

(56) References Cited

U.S. PATENT DOCUMENTS

| | | | |
|---|---|---|---|
| 11,017,513 B1* | 5/2021 | Yarlagadda | G06K 9/626 |
| 2016/0068267 A1 | 3/2016 | Liu et al. | |
| 2018/0039269 A1* | 2/2018 | Lambermont | G01S 13/865 |
| 2018/0173229 A1* | 6/2018 | Huang | G05D 1/0278 |
| 2020/0278665 A1* | 9/2020 | Arditti Ilitzky | G06K 9/6218 |

* cited by examiner

| Localization data source | Sensor | Sensor technology | Sensor type | Overseen environment |
|---|---|---|---|---|
| 16 | 2 | LIDAR | Type 1 | 2' (partially overlapping 3', 4') |
| 17 | 3 | LIDAR | Type 2 | 3' (partially overlapping 2', 4') |
| 18 | 4 | LIDAR | Type 1 | 4' (partially overlapping 2', 3') |
| 11 | 5 | Video | Type 3 | 5' |
| 12 | 6 | Video | Type 3 | 6' |
| 13 | 7 | GPS | Type 4 | |
| 14 | 8 | IMU | Type 5 | |
| 10 | 2 | LIDAR | Type 1 | 2' (partially overlapping 3', 4') |
| | 3 | LIDAR | Type 2 | 3' (partially overlapping 2', 4') |
| | 4 | LIDAR | Type 1 | 4' (partially overlapping 2', 3') |
| 15 | 2 | LIDAR | Type 1 | 2' (partially overlapping 3', 4') |
| | 3 | LIDAR | Type 2 | 3' (partially overlapping 2', 4') |
| | 4 | LIDAR | Type 1 | 4' (partially overlapping 2', 3') |
| | 5 | Video | Type 3 | 5' |
| | 6 | Video | Type 3 | 6' |
| | 7 | GPS | Type 4 | |
| | 8 | IMU | Type 5 | |

Fig.2

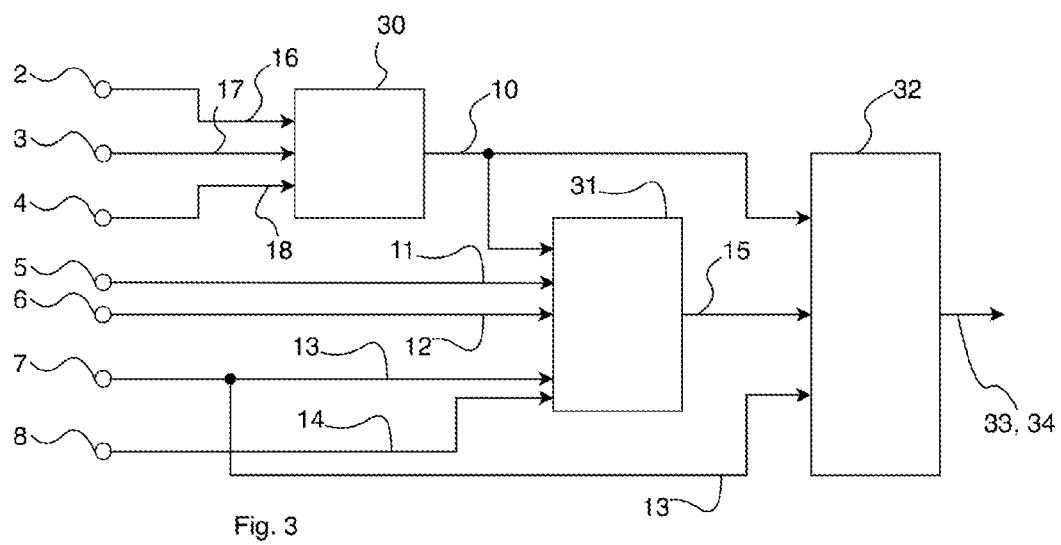

METHOD AND SYSTEM FOR MODIFYING THE SPEED OF A VEHICLE DEPENDING ON THE VALIDATION OF ITS CALCULATED LOCALIZATION FIELD

CROSS-REFERENCE

The present application claims priority to European Patent Application No. 19315032.3, entitled "METHOD AND SYSTEM FOR MODIFYING THE SPEED OF A VEHICLE DEPENDING ON THE VALIDATION OF ITS CALCULATED LOCALIZATION FIELD", filed on May 6, 2019, the entirety of which is incorporated herein by reference.

BACKGROUND

Today's vehicles, including autonomous or driverless ones, commonly use means for localization of the vehicle. These localization means often involve sensors mounted on the vehicle with a given technology and of a certain type, overseeing a given environment around and about the vehicle as the case may be, coupled with algorithms to process raw data produced by the sensors and calculate a localization of the vehicle.

«Sensor» as used herein, designates a device making use of one or more of localization technologies, such as, without limitation:
- lightwave emission and reflection, such as used in an opto-electronic apparatus (ex: LIDAR sensor), based on the principle of emitting a lightwave beam, catching the reflections of objects in the field of view, and providing distance information about reflecting objects, with a given scanning frequency in one or multiple scanning layers;
- radio detection and ranging (RADAR), which in its simplest form consists of a transmitted radio signal aimed by an antenna at a particular direction, and of a receiver that detects echoes off any object in the path of the radio signal;
- satellite navigation systems (GNSS) that exploit time signals received by radio waves from satellites in sight, to infer geo-spatial positioning;
- digital cameras that take 2D images which are then processed to create a 3D mapping of the vehicle's environment;
- Inertial Measurement Units (IMU) which are devices measuring and reporting on data such as a vehicle's force or angular rate, using in particular a combination of accelerometers and gyroscopes;
- Encoders, which are devices measuring and reporting on data such as positions, angles, velocities of elements such as the vehicle's wheels or motor shaft.

Sensors are of various «type», depending on the equipment manufacturer, or sometimes even when provided by the same manufacturer. For example LIDAR sensors of different types will have different commercial references and part numbers, and/or different technical specifications, for example in relation to characteristics of the field of view, the scanning rate, the resolution, etc.

A «localization data source» as used herein is a flow of localization data output by a given algorithm applied on raw data provided by a sensor mounted on the vehicle, overseeing a given environment around and about the vehicle as the case may be (depending on the sensor technology). In this context, two localization data sources are independent» if at least one of the sensor technology, sensor type, algorithm or overseen vehicle environment as the case may be, is different from one localization data source to the other.

To improve accuracy and reliability of the calculation of the localization of the vehicle, several independent localization data sources are commonly implemented in a vehicle, and their data fused using known algorithms, to transform data into calculation of localization of the vehicle. Without this independence, a single flaw or bug in any of sensor technology, sensor type, or algorithm, or a change in the overseen vehicle environment such as construction of a new building, may affect all localization data sources, and the resulting calculated vehicle localization be flawed.

However, even with fusion algorithms of redundant and independent localization data sources, there always remains a risk that calculated vehicle localization be flawed. There is therefore a need for a method and system for validating the calculated localization of a vehicle, and modifying its speed accordingly.

SUMMARY

The present technology relates to a method and system for modifying the speed of a vehicle depending on the validation of its calculated localization.

Various implementations of the present technology provide a method of modifying the speed of a vehicle equipped with P (P>=2) independent localization data sources, wherein a calculated localization (15) for the vehicle is a result with a first uncertainty of processing data from a subset Q (P>=Q>=1) of the P independent localization data sources, the method comprising the steps of:
- selecting a first subset of M currently reliable localization data sources (M<=P) within the P independent localization data sources if data they provide are above a predetermined Reliability Threshold:
- selecting a second subset of N compatible localization data sources (N<=M) within the M currently reliable independent localization data sources providing data at a distance with the calculated localization which is lower than a predetermined Compatibility Threshold; and
- modifying the speed of the vehicle depending on the number N, the number P, the number M and a predetermined Voting Threshold.

In various implementations of the method, it further includes the steps of:
- identifying all compatible pairs of localization data sources within the N localization data sources and the calculated localization, where the distance between the data provided by the localization data sources in the pair is lower than the predetermined Compatibility Threshold;
- identifying all clusters of transitively compatible localization data sources within the compatible pairs;
- identifying within the identified clusters a majority cluster which comprises the highest number of localization data sources; and
- further modifying the speed of the vehicle if the calculated localization is not part of the majority cluster, until the calculated localization becomes part of the majority cluster.

In various implementations of the method, the step of modifying the speed of the vehicle comprises comparing the number N with the predetermined Voting Threshold being comprised between 1 and P.

In various implementations of the method, the step of modifying the speed of the vehicle comprises comparing the ratio N/M with the Predetermined Voting Threshold being comprised between 0 and 1.

In various implementations of the method, the uncertainty of the calculated localization is increased up to a second uncertainty until the calculated localization becomes part of the majority cluster.

In various implementations of the method, the value of at least one of the predetermined Reliability, Compatibility and Voting Threshold is dynamically adjusted depending on the environmental conditions for the vehicle.

In various implementations of the method, the predetermined Reliability Threshold is different from one localization data sources to the other in the first subset of M.

In various implementations of the method, the predetermined Reliability Threshold is the same for at least two of the M localization data sources in the first subset.

Various implementations of the present technology provide a system of modifying the speed of a vehicle comprising:
  a Vehicle Steering and Traction Actuator Systems;
  P (P>=2) independent localization data sources; and
  a calculator module configured to calculate a localization for the vehicle as a result with a first uncertainty of processing data from a subset Q (P>=Q>=1) of the P independent localization data sources; and—a validation module configured to:
    select a first subset of M currently reliable localization data sources (M<=P) within the P independent localization data sources if data they provide are above a predetermined Reliability Threshold;
    select a second subset of N compatible localization data sources (N<=M) within the M currently reliable independent localization data sources providing data at a distance with the calculated localization which is lower than a predetermined Compatibility Threshold; and
    send a command signal to the Vehicle Steering and Traction Actuator Systems to modify the speed of the vehicle depending on the number N relative to the number M and a predetermined Voting Threshold.

In various implementations of the system, the validation module is further configured to:
  identify all compatible pairs of localization data sources within the N localization data sources and the calculated localization, where the distance between the data provided by the localization data sources in the pair is lower than the predetermined Compatibility Threshold;
  identify all clusters of transitively compatible localization data sources within the compatible pairs;
  identify within the identified clusters a majority cluster which comprises the highest number of localization data sources; and
  send a command signal to the Vehicle Steering and Traction Actuator Systems to further modify the speed of the vehicle if the calculated localization is not part of the majority cluster, until the calculated localization becomes part of the majority cluster.

In various implementations of the system, it further comprises a remote supervision system which is informed of the state of the command signal.

In various implementations of the system, the remote supervision system controls the Vehicle Steering and Traction Actuator Systems depending on the state of the command signal.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 is an illustration of localization data sources implemented in a vehicle in an embodiment of the invention;

FIG. 3 is an illustration of a system for validation of the calculated localization of a vehicle in an embodiment of the invention;

It should be noted that, unless otherwise explicitly specified herein, the drawings are not to scale. Finally, elements that are identical from one drawing to the other bear the same numeral reference across drawings.

DETAILED DESCRIPTION

Figure 1:
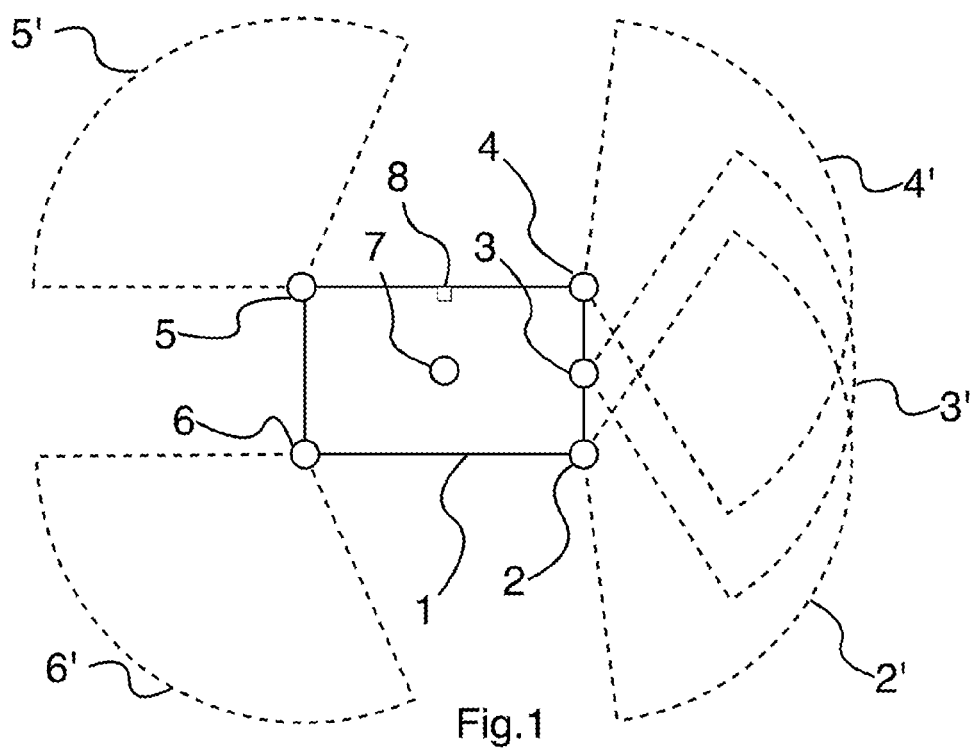
FIG. 1 is a top view of a vehicle equipped with sensors.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). In the aforementioned, explicit use of the term a «processor» should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that «module» may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 is a top view of a vehicle equipped with sensors. Merely as an illustration of an embodiment of the invention, a vehicle 1 may be equipped with sensors 2-8 with the following exemplary features and characteristics.

Sensors 2-4 may for example be using LIDAR technology, with sensors 2 and 4 being of a type 1, and sensor 3 of a type 2, overseeing respective environments 2', 3' and 4' around and about vehicle 1, such environments partially overlapping. As an example, and using specifications of commercially available sensors, type 1 and type 2 may differ as in Table 1:

invention. Merely as an illustration of an embodiment of the invention, the localization data sources may for example feature the following characteristics. Localization data sources 16-18 may reflect data provided by respectively sensors 2-4. Localization data sources 11-14 may reflect data provided by respectively sensors 5-8. Localization data source 10 may be the result of a fusion algorithm between data provided by sensors 2-4 through localization data sources 16-18, as explained below. Localization data source 15 may be the result of a fusion algorithm between data provided by sensors 2-8 through localization data sources 10-14, as explained below.

Localization data sources as in the present illustration of an embodiment of the invention are independent as at least one of the associated sensor technology, type, algorithm for processing raw data from the sensor, or overseen environment, varies from one localization data source to the other. For example, localization data source 10 differs from localization data source 11 through at least sensor technology, type and overseen environment. Localization data source 11 differs from localization data source 12 through at least the overseen environment.

FIG. 3 is an illustration of a system for validation of the calculated localization of a vehicle in an embodiment of the invention. Sensors 2-8 are represented as well as localization data sources 10-18 pursuant to FIG. 2.

A processing algorithm module 30 may process raw data received from respectively sensors 2-4 and provide localization data source 10 as the result of a processing of data provided by sensors 2-4. The person skilled in the art knows how to implement different processing algorithms, such as lidar localization algorithms (based on landmarks, or based on occupancy grids, etc), visual localization algorithms, Simultaneous Localization And Mapping (SLAM) algorithms, radar localization, etc.

A localization calculation of vehicle 1 may be calculated in calculator module 31, and provided through calculated localization data source 15. As is known, such calculation comes with a given uncertainty. Calculator module 31 may fuse data received from localization data sources 10-14. The person skilled in the art knows how to fuse different data, such as with bayesian filtering (e.g. Kalman Filter and its derivatives, Particle Filters, . . . ), global optimization, etc. . . . .

TABLE 1

| Lidar Type | Horizontal FOV | Min Range | Max Range | Distance Resolution | Scan Rate | Interface | Horizontal Angular Resolution | Vertical FOV |
|---|---|---|---|---|---|---|---|---|
| 1 | 110° (50° to 60°) | <0.3 m | 200 m (90%) | 4 cm | 6.25 Hz, 12.5 Hz, 25 Hz | Ethernet, CAN | Up to 0.125° | 6.4° |
| 2 | 360° | 1 m | 100 m | | 5 Hz- 20 Hz | 100 Mbps Ethernet | 0.17° @ 10 Hz | 2° to −24.9° |

Sensors 5-6 may for example be using digital video technology, with sensors 5 and 6 being cameras of the same type 3, overseeing respective non overlapping environments 5' and 6' around and about vehicle 1.

Sensor 7 may be using satellite-based radio navigation, such as a GPS system, and not be per se overseeing an environment of vehicle 1.

Sensor 8 may be an inertial measurement unit (IMU) gathering data such as vehicle 1's current speed, turn rate, heading, inclination and/or acceleration.

FIG. 2 is an illustration of possible localization data sources implemented in a vehicle in an embodiment of the It is to be noted that the choice represented of localization data sources fused in calculator module 31 is merely for illustration purposes: according to the invention, different localization data sources could be fed into calculator module 31 for generation of calculated localization data source 15, including a subset only of all the localization data sources provided by all the sensors mounted on vehicle 1.

A validation module 32 may process data received from localization data sources 10 and 13, and compare them with the calculated localization data source 15. Once comparison is made, validation module 32 may issue command signals to command for example vehicle 1's traction and steering actuators, safety critical systems and/or its navigation system.

It will be apparent to the person skilled in the art, that command signals also encompasses signals that do not command per se but merely provide an alert of possibly varying degree. In one embodiment of the invention, validation module 32 may issue two command signals 33 and 34. However in another embodiment, only one command signal, either 33 or 34 may be issued. Validation module 32 may issue command signal 33 to modify the speed of vehicle 1 including as the case may be to put it to a halt in an emergency situation.

It is to be noted that the represented choice of compared localization data sources is merely for illustration purposes: according to the invention, localization data sources other than localization data sources 10 and 13 could be fed into validation module 32 for comparison with calculated localization data source 15, including certain localization data sources that are not fed into calculator module 31.

We will now describe in more detail the validation module 32's structure and functioning.

As explained above, validation module 32 may be fed with both the calculated localization data source 15, and at least one localization data source among the localization data sources implemented in vehicle 1 (two independent ones, 10 and 13, are represented on FIG. 3 as an example). Validation module 32 may compare data from the calculated localization data source 15 with data provided by the independent localization data sources fed to it.

At any point in time t, validation module 32 may determine whether localization data sources fed to it are «currently reliable» in the sense that they provide data in a quantity and of a quality that are deemed sufficient.

Quality in relation to a localization data source is associated with an information representative of accuracy and robustness of the data. The person skilled in the art knows how to make use of for example a covariance matrix, to associate a measure of quality to data provided by a localization data source, and to determine a threshold for such covariance above which data from a localization data source are deemed to be of sufficient quality. Quantity in relation to a localization data source is associated with an information representative of the frequency of occurrences prior to time t, of data from the localization data source having a sufficient quality. The person skilled in the art knows how to make use of for example a sliding window of time in relation to time t, during which the number of data of sufficient quality produced by a localization data source during that time window is compared with another threshold, and the quantity is deemed sufficient if that number exceeds the threshold.

As will be appreciated by the person skilled in the art, both thresholds and duration of the sliding window of time for quality and quantity may be determined for example in relation to technical characteristics of the sensor(s) involved in a localization data source and/or the ability of the algorithm involved in the localization data source to process data at a given rate. In relation to a localization data source, a «Reliability Threshold» is defined as the minimum acceptable level (from a quality and/or quantity perspective) in order to consider such localization data source to be currently reliable.

Figure 4:
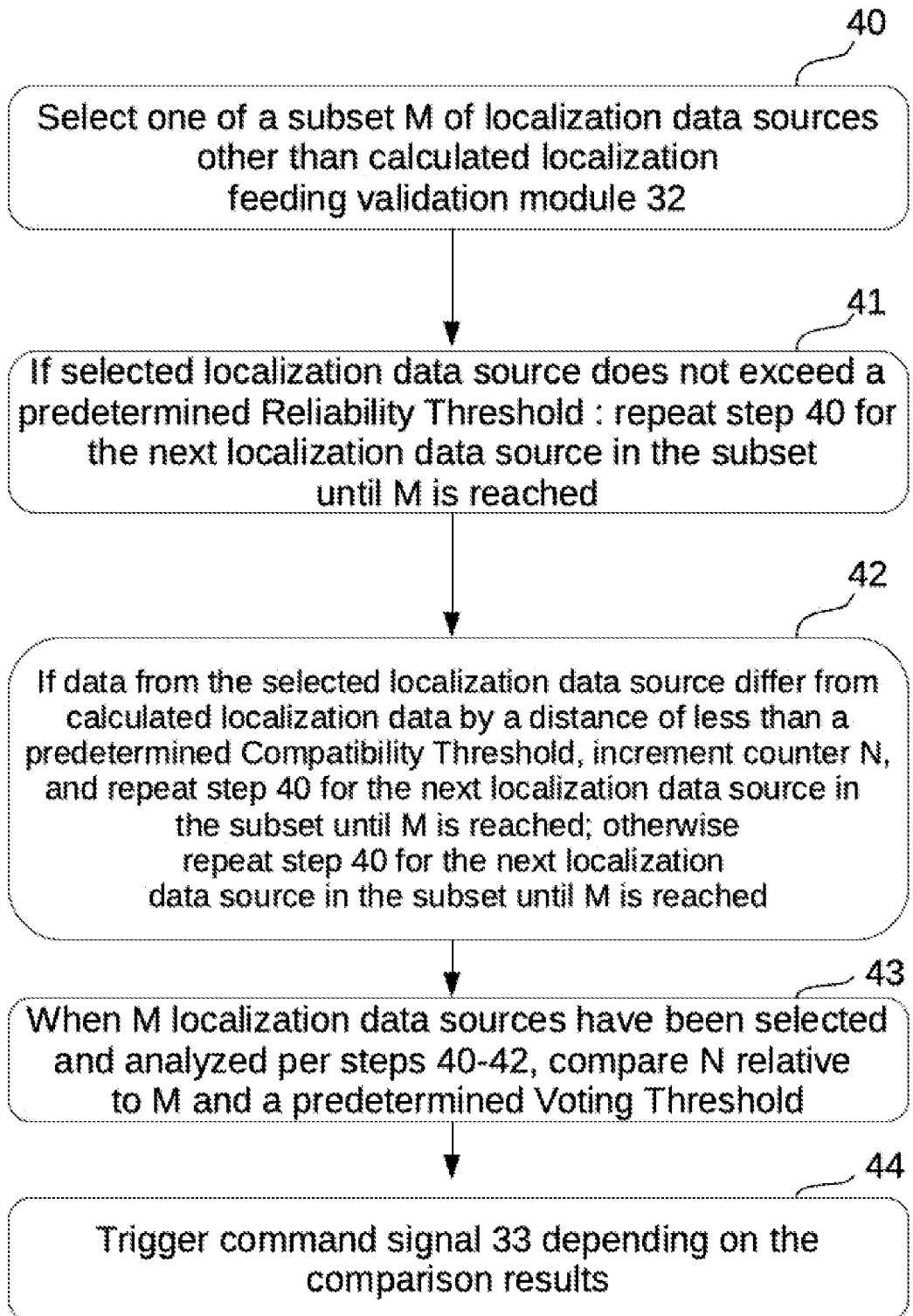
FIG. 4 is a flowchart illustrating part of the validation process in an embodiment of the invention.

FIG. 4 is a flowchart illustrating part of the validation process in an embodiment of the invention.

The process may be implemented in validation module 32. It is repeated with a frequency as permitted by data processing capabilities onboard vehicle 1, and/or as needed to ensure the safety of operation, for example in relation to the maximum speed afforded by vehicle 1. The illustration assumes that part or all of localization data sources that equip vehicle 1, as a subset of M localization data sources, are feeding validation module 32. A calculated localization data source is also feeding validation module 32.

At step 40, one localization data source in the subset M is selected.

At step 41, it is determined whether such selected localization data source is currently reliable, ie: exceeds a predetermined Reliability Threshold: if it is not, step 40 is repeated for the next localization data source in the subset M. The predetermined Reliability Threshold may be different or the same from one selected localization data source to the other. At step 42, data from the selected and currently reliable localization data source are compared with the data of the calculated localization data source: if such data differ by a distance of less than a predetermined Compatibility Threshold, a counter N is incremented, and step 40 is repeated for the next localization data source in the subset M.

«Distance» is a measure of proximity in the general sense and encompasses distances that do not feature all the properties of a mathematical distance. This distance may be measured in different ways, and the person skilled in the art knows how to compute such a distance. For example, this distance may be the euclidean distance between two positions, or the mahalanobis distance, etc.

It will be appreciated by the person skilled in the art that the measure of the distance between two localization data sources may also take into account specific circumstances, such as:

the localization data sources are not temporally synchronized: this may for example be dealt with by measuring the distance of the closest data, by using interpolation of data, and/or by using interpolation of data from a third localization data source, etc.;

the localization data sources are affected by noise: this may for example be dealt with by taking the average, minimum or maximum distance over a sliding window of time, and/or exponential smoothing, etc; or the standards for what qualifies as a safe vehicle navigation evolve: this may for example be dealt with by adjusting predetermined thresholds, depending on the vehicle's environment, the acceptable level of navigation risk, and/or the reliability of data from the localization data sources, etc.

«Compatibility Threshold» as defined herein is the maximum acceptable distance between data of localization data sources for such sources to be considered compatible.

Going back to FIG. 4, at step 43, when all localization data sources in the subset M have been selected and analyzed per steps 40-42, then a comparison is made between N relative to M and a predetermined Voting Threshold.

At step 44, validation module 32 triggers command signal 33, depending on the result of the aforementioned comparison, to modify the speed of vehicle 1.

«Voting Threshold» may be absolute or relative. As an example, a relative Voting Threshold may be predetermined between 0 and 1, and the comparison be made at step 43 between the ratio N/M and the Voting Threshold. As another example, an absolute Voting Threshold may be predetermined as an integer number between 1 and M, and the comparison be made at step 43 between N and the Voting Threshold.

In one embodiment, the speed of vehicle 1 may be lowered, up to putting vehicle 1 to a halt as the case may be, when the comparison of N relative to M and the predetermined Voting Threshold is unfavorable, ie: a minimum acceptable number or ratio of currently reliable and compatible localization sources is not reached.

The person skilled in the art will appreciate that other processes may be implemented, without departing from the scope of the invention, leading up to a determination of a count of localization data sources being both currently reliable and whose data are compatible (ie: within distance below the predetermined Compatibility Threshold) of data provided by a calculated localization data source.

In one embodiment of the invention, not all localization data sources in the subset M have the same weight, and the count N reflects such differences. For example, count N may be incremented, if compared data are within distance for currently reliable sources, by 0.5 for certain localization data sources, and 2 for certain others. This is to reflect the higher importance that may be given to certain of the localization data sources producing data within distance of the calculated localization data source. For example: a localisation data source coming from a GNSS sensor may be given less weight compared to other localisation data sources when vehicle 1 is in a high rise building environment, or a localisation data source coming from a digital camera may be given less weight at night time.

Going back to the system as illustrated FIG. 3: the subset M comprises localization data sources 10 and 13 (M=2). According to the invention, it may for example be decided, in order to ensure the safety of operation of vehicle 1, that:
- if N=0, command signal 33 is triggered and vehicle 1 put to a halt; this can result from both localization data sources 10 and 13 being currently not reliable or both data from localization data sources 10 and 13 differing from data of calculated localization source 15 by a distance of more than a predetermined Compatibility Threshold, or a combination thereof;
- if N=1 or N=2, command signal 33 is not triggered.

In a different embodiment, it may be decided in addition that:
- if N=1 but has not been incremented as a result of localization data source 10, which realizes the fusion of three LIDAR sensors of primary importance, then command signal 33 is also triggered.

Figure 5:
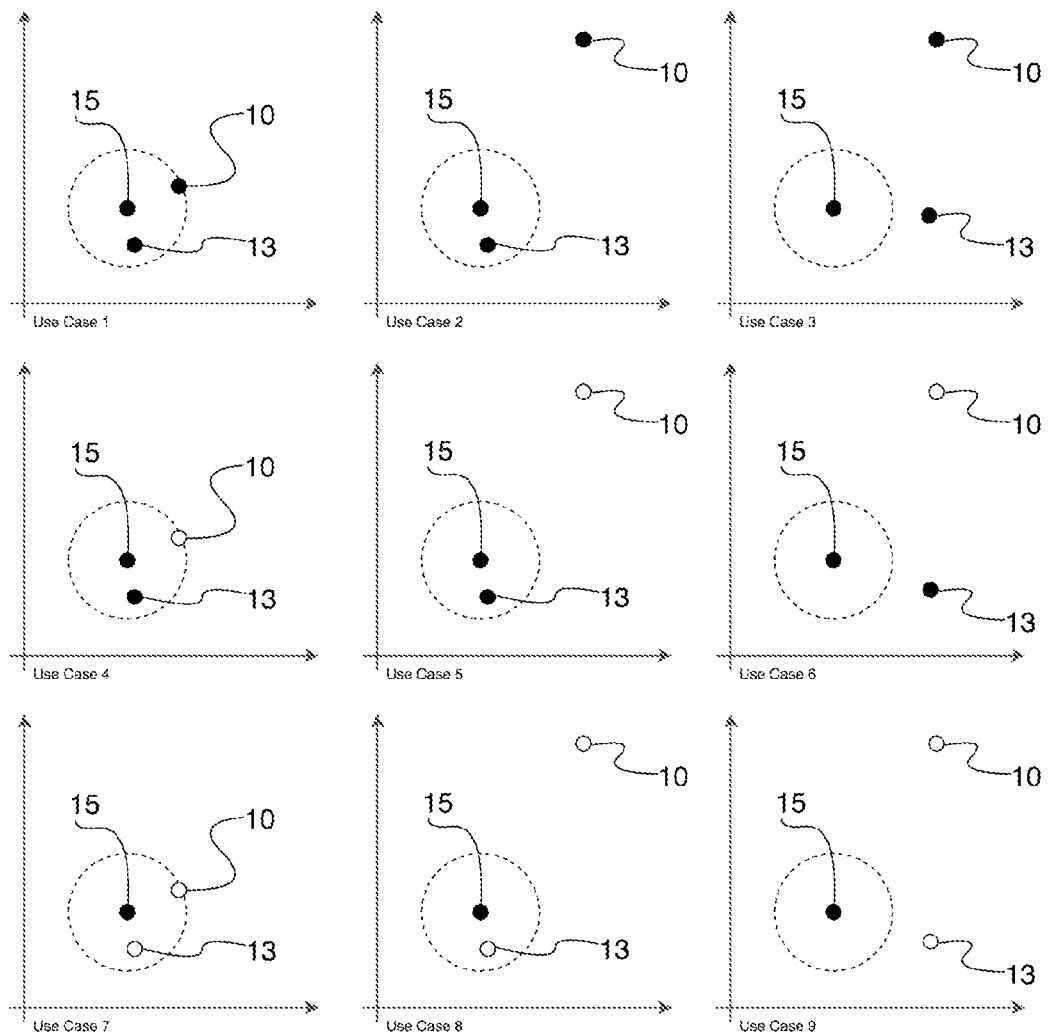
FIG. 5 visually illustrates a validation scenario according to an embodiment of the invention.

FIG. 5 visually illustrates a validation scenario according to an embodiment of the invention.

As a particular embodiment of the invention, the algorithm used herein does not de-select localization sources that are not currently reliable, contrary to what is done at step 41 in relation to FIG. 4: it instantly assesses both reliability and compatibility of data of localization data sources, and triggers command signal 33 in certain assessment combinations, while postponing such triggering for a period of time, then initiating such triggering only if the assessment of reliability and compatibility of data of localization sources has remained the same.

On FIG. 5, the data of calculated localization data source 15 is always at the center of a circle representing a distance that is below a predetermined Compatibility Threshold around the value of that data. Data of localization data sources 10 and 13 are also represented, currently available (represented as a solid dot) or not (represented as a hollow dot) depending on the use case, and whose value is within or outside of the circle, as follows in Table 2:

TABLE 2

| Use case | Assessment: localization data source 10 currently available? | Assessment: localization data source 13 currently available? | Assessment: data of localization data source 10 within compatible distance? | Assessment: data of localization data source 13 within compatible distance? | Command signal 33 triggered? |
|---|---|---|---|---|---|
| 1 | Yes | Yes | Yes | Yes | No |
| 2 |  |  | No |  |  |
| 3 |  |  |  | No | Yes |
| 4 | No |  | Yes | Yes | No |
| 5 |  |  | No |  |  |
| 6 |  |  |  | No | Yes |
| 7 |  | No | Yes | Yes | Yes after assessment has remained same for a period of time |
| 8 |  |  | No |  |  |
| 9 |  |  |  | No |  |

Validation module 32 may issue alternatively, or in addition, command signal 34 to, as the case may be, vary vehicle 1's speed, including put it to a halt.

Figure 6:
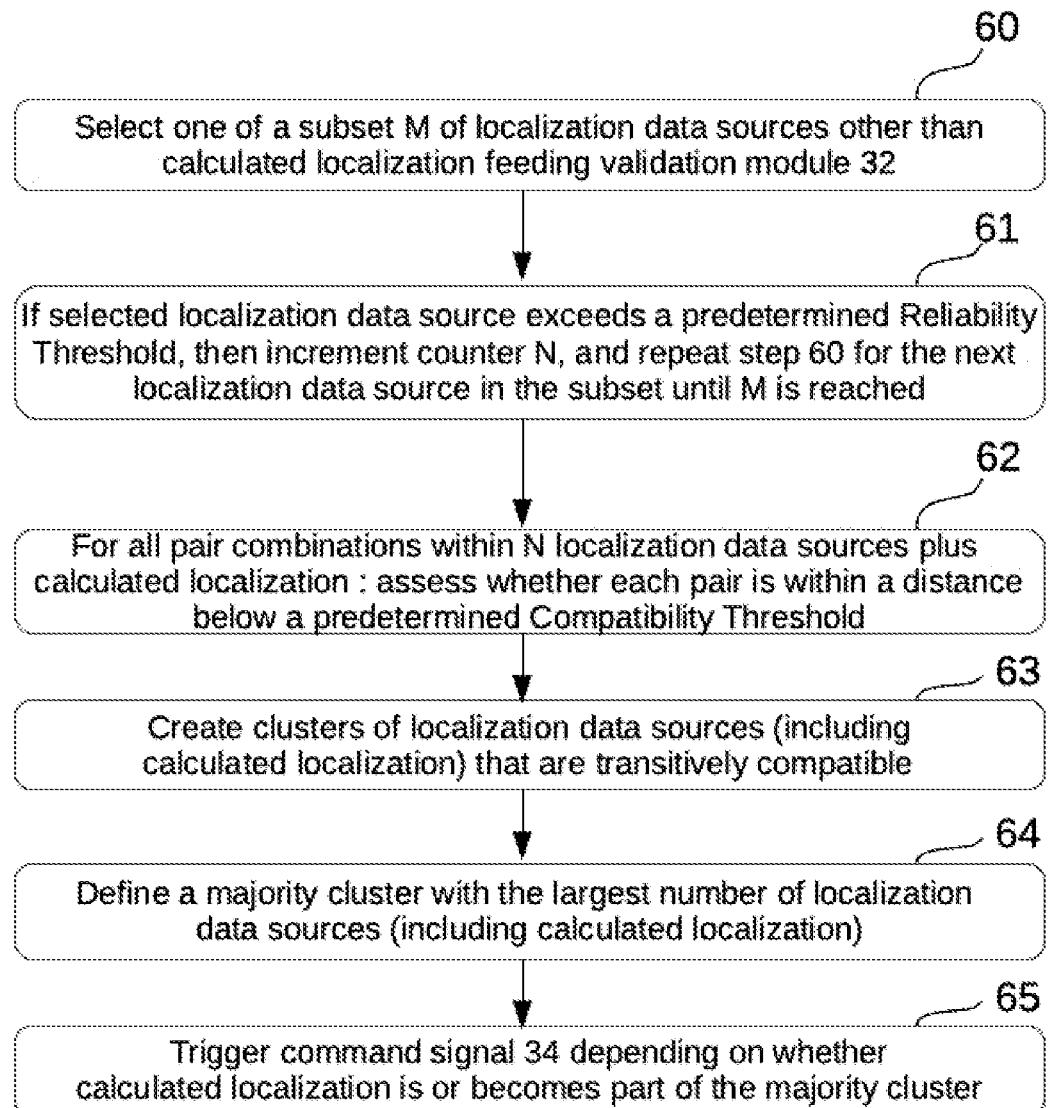
FIG. 6 is a flowchart illustrating part of the validation process in another embodiment of the invention.

FIG. 6 is a flowchart illustrating part of the validation process in another embodiment of the invention.

The process may be implemented in validation module 32. It is repeated with a frequency as permitted by data processing capabilities onboard vehicle 1, and/or as needed to ensure the safety of operation, for example in relation to the maximum speed afforded by vehicle 1. The illustration assumes that part or all localization data sources that equip vehicle 1 are feeding validation module 32 as a subset of M localization data sources. A calculated localization data source is also feeding validation module 32.

At step 60, one localization data source in the subset M is selected.

At step 61, it is determined whether such selected localization data source is currently reliable, ie: exceeds a predetermined Reliability Threshold. If it is, a counter N is incremented, if it is not, step 60 is repeated for the next localization data source in the subset M. The predetermined Reliability Threshold may be different or the same from one selected localization data source to the other.

At step 62, all localization data sources within N that are currently reliable, plus the calculated localization data source, are grouped in as many pairs as may possibly be combined amongst such N+1 data sources. Each pair is assessed to determine whether data between the two localization data sources in the pair are compatible, ie: such data differ by a distance of less than a predetermined Compatibility Threshold.

At step 63, clusters are created of localization data sources that are «transitively compatible». For example if localization data source A is compatible in a pair with localization data source B, which itself is compatible in another pair with localization data source C, then all three data sources A, B and C belong to a cluster of transitively compatible localization data sources.

At step 64, a «majority cluster» is defined amongst clusters of step 63, which is the cluster with the largest number of localization data sources. In case two or more clusters share the largest number, priority is given to the cluster with the best average compatibility between localization data sources. The calculated localization data source may or may not be part of that majority cluster.

At step 65, depending on whether the calculated localization data source is or becomes part of the majority cluster, validation module 32 triggers command signal 34, to modify the speed of vehicle 1.

uncertainty: for example, the speed may be decreased when uncertainty is increased. In one embodiment, speed adjustment may be dependent upon lateral and longitudinal components of the calculated localization uncertainty, for example the decrease in speed may be higher if the increase in uncertainty of the calculated localization affects its lateral components more so than its longitudinal components; and/or at any point, vehicle 1 may be stopped if the number of localization data sources compatible with the calculated localization data source is lower than an absolute threshold that does not depend on the number N of currently reliable localization data sources.

Going back to the system as illustrated FIG. 3: the subset M comprises localization data sources 10 and 13 (M=2). Assuming both localization data sources 10 and 13 are currently reliable (N=2), three pairs of data sources may be combined, including calculated localization data source 15. Looking at compatibility of data sources within each pair, this gives eight different scenarios of overall compatibility as follows in Table 3:

TABLE 3

| Scenario | Pairs of data sources | | | Cluster with 3 transitively compatible data sources | Cluster with 2 transitively compatible data sources |
| --- | --- | --- | --- | --- | --- |
| | 15-10 compatible? | 15-13 compatible? | 10-13 compatible? | | |
| 1 | Yes | Yes | Yes | 1 | 0 |
| 2 | | | No | 1 | 0 |
| 3 | | No | Yes | 1 | 0 |
| 4 | | | No | 0 | 1 |
| 5 | No | Yes | Yes | 1 | 0 |
| 6 | | | No | 0 | 1 |
| 7 | | No | Yes | 0 | 1 |
| 8 | | | No | 0 | 0 |

In one embodiment, the speed of vehicle 1 may be lowered, up to putting vehicle 1 to a halt as the case may be, until the calculated localization data source becomes part of the majority cluster.

The person skilled in the art will appreciate that other processes may be implemented, without departing from the scope of the invention, leading up to a determination of whether the calculated localization data source is part of the majority cluster.

In one embodiment of the invention, the uncertainty around data of the calculated localization data source is increased as necessary, while vehicle 1 is being slowed down, so that the calculated localization data source becomes part of the majority cluster.

The uncertainty may be increased in different ways, as is known to the person skilled in the art, whether in the same manner for all degrees of freedom, or in a distinct manner depending on the degree of freedom based on the impact on compatibility with other localization data sources.

The speed of vehicle 1 may be modified through command signal 34 in this process at various steps, for example:
 if at step 61, it is determined that the number N of currently reliable localization data sources is too low, vehicle 1 may be stopped;
 at steps 65, vehicle 1 may be slowed down and its maximum speed adjusted until the calculated localization data source becomes part of the majority cluster. In one embodiment of the invention, the speed may be adjusted to the increase of calculated localization data The invention may be implemented with either command signal 33, or command signal 34, or both. As will be appreciated by the person skilled in the art, each command signal is associated with a particular calculated localization validation scheme: command signal 33 may be a command signal to modify the speed of vehicle 1, including as the case may be to put it to a rapid halt in certain situations of safety thresholds being crossed, whilst command signal 34 may modify the speed of vehicle 1 (also including put it to a halt as the case may be) and ensure comfortable and efficient, yet secure operation. A combination of the two signals and associated schemes may be had in one embodiment of the invention.

It will be apparent to the person skilled in the art, that command signals also encompasses signals that do not command per se but merely provide an alert of possibly varying degree.

The "environmental conditions" in which vehicle 1 operates may have an impact both on the calculation of the localization, and on its validation that affects the speed of vehicle 1 according to the invention. For example, without limitation: the conditions may be urban (vehicle 1 surrounded by buildings) or rural (vehicle 1 surrounded by vegetation/trees), and/or may vary in relation to the width of the lane in which vehicle 1 circulates, and/or traffic conditions, and/or type of other users (pedestrians, bikes, cars, ... ) sharing the road with vehicle 1. In an embodiment of the invention, environmental conditions may be taken into consideration to establish the predetermined Reliability, and/or Compatibility and/or Voting Threshold. In a further embodiment, the evolution over space and time of vehicle 1's trajectory and motion, through changing environmental conditions, may also be taken into consideration by dynamically varying the values of the predetermined thresholds.

As an example, for a vehicle 1 that is autonomous and regularly follows the same route, environmental conditions may be taken into consideration by giving values to the predetermined thresholds that have been empirically (through results of field experience records and verification and validation testing) determined for the route to yield a level of vehicle speed permitted by the validation of the calculated localization that is acceptable from a safety perspective. Typically, values given to the thresholds would take into account either average or worst case environmental conditions leading to either a more permissive or a more conservative behavior of the vehicle.

As another example, the values for the Reliability Threshold may be dynamically varied to account for the better inherent accuracy of certain localization data sources in certain environmental conditions, in particular when such environmental conditions evolve along the route followed by vehicle 1. For example, for a vehicle 1 going successively through a rural area and an urban area: the person skilled in the art knows how to lower the value of the Reliability Threshold for a GPS based localization data source in a rural area, and raise it in an urban area (where GPS signal is more susceptible to being obstructed by buildings, the reliability threshold has to be higher). Conversely lower the value of the Reliability Threshold for a SLAM algorithm based localization data source in an urban area, and raise it in a rural area (where objects like vegetation and trees are more susceptible than buildings to a change in appearance).

As yet another example, the values for the Compatibility Threshold may be dynamically varied to account for the width of the road lane in which vehicle 1 operates. In narrow lanes, a small error of localization could quickly lead to a hazardous event whereas operating in large lane would be more tolerant to localization error. The person skilled in the art knows how to raise the value of the Compatibility Threshold in a large lane area, then lower it in a narrow lane area.

As yet another example, the values for the Voting Threshold may be dynamically varied to a higher value in areas of high traffic conditions, or densely populated areas, as may be determined by the person skilled in the art, to account for a lower tolerance for the risk of collision and for stricter safety requirements.

The person skilled in the art may dynamically vary certain or all three of the Reliability, Compatibility and Voting Threshold to adjust vehicle 1's acceptable behaviour according to its environmental conditions.

Figure 7:
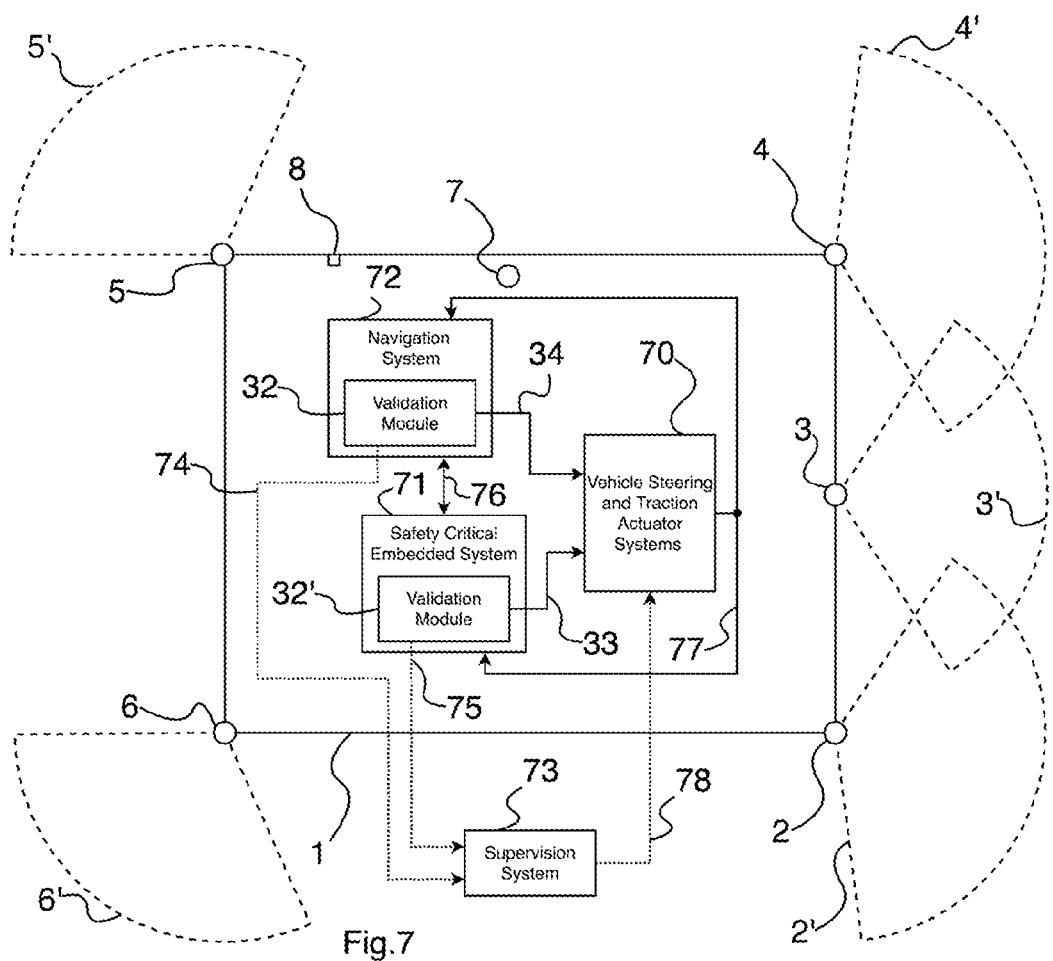
FIG. 7 is a block diagram showing the configuration in an embodiment of the invention for an autonomous or driverless vehicle.

FIG. 7 is a block diagram showing the configuration in an embodiment of the invention for the autonomous or driverless vehicle 1 as illustrated FIG. 1, with the system for validation of the calculated localization as illustrated FIG. 3. Validation module 32, 32' is represented, but for the sake of clarity, not the interactions between such module and the sensors, which are described in relation to FIG. 3.

FIG. 7 illustrates a vehicle in which both command signals 33 and 34 are implemented (hence the duplication of representation of validation module 32 into 32'). However the invention encompasses including when only one of the two command signals is implemented.

A safety critical embedded system 71 sends command signal 33 to a vehicle steering and traction actuators system 70, and receives feedback from it through data link 77. Safety critical embedded system 71 comprises validation module 32'.

A navigation system 72 sends command signal 34 to the vehicle steering and traction actuators system 70, and receives feedback from it through data link 77. Navigation system 72 comprises validation module 32.

Safety critical embedded system 71 and Navigation system 72 interact through data link 76. In particular, decisions made by the safety critical embedded system 71 may be communicated to navigation system 72, so that they may in one embodiment, as they relate to safety, prevail over those of navigation system 72, and the command signal 33 may prevail over command signal 34 when commanding the vehicle steering and traction actuators system 70.

In the alternate, or in addition, validation modules 32 and 32' may communicate to a remote supervision system 73 through respective data links 74 and 75 which may take the form of an over-the-air data channel. Remote supervision system 73 may thus be informed including of calculations made by validation modules 32 and 32' and of the state of the command signal 33 and/or 34, and take control as is known by the person skilled in the art, of the speed and/or trajectory of vehicle 1 accordingly, through data link 78 which may take the form of an over-the-air data channel, between supervision system 73 and vehicle steering and traction actuators system 70. In one embodiment, remote supervision system 73 is merely informed of the state of command signals 34 and 33 (alert signals).

It will also be appreciated by the person skilled in the art that, although conceptually represented physically separated on FIG. 7, blocks such as 70, 71, and 72 represent functions which may be realized in single physical entities. Conversely, although conceptually represented physically embedded, blocks 32 and 72 (respectively 32' and 71) represent functions which may be realized in separate physical entities.

Each block may comprise hardware and/or software and/or firmware (or a combination thereof), as is known in the art, to execute functions according to the invention, including the processes described in relation to FIG. 4 and FIG. 6.

The invention is applicable to localization data sources with data that are absolute, defined in a known reference frame so that they can be transformed and compared in a common reference frame (which can be static or moving), and coordinates that are completely observed by all the sources in this common reference frame.

Data provided by a localization data source are «absolute» when they relate directly to the position and orientation of vehicle 1. They are not when they relate only indirectly by providing derivative data such as velocity, acceleration, etc that can be transformed into position and orientation.

Data from localization data sources are expressed in a «reference frame». A reference frame is defined by a coordinate system and a set of physical reference points that uniquely locate and orient the coordinate system. A reference frame may be static or moving. The person skilled in the art knows how to convert data expressed in a frame into data expressed in another frame when the geometric transformation between the two frames is known.

A coordinate of the vehicle localization expressed in a frame is «completely observed» by a localization data source if it is possible to transform it with a computation into this coordinate. A localization data source that is modified to aggregate multiple data in order to obtain more information is considered as a new localization data source, that can completely observe more coordinates.

The invention claimed is:

1. A method of modifying the speed of a vehicle equipped with a plurality of independent localization sources of data, wherein a calculated localization source of data provides a calculated location of the vehicle with a first uncertainty as a result of processing data from a subset of the plurality of independent localization sources of data, the method comprising the steps of:
   forming a first subset of the plurality of independent localization sources of data comprising all sources of data, of the plurality of independent localization sources of data, that provide data in a quantity and of a quality above a predetermined Reliability Threshold;
   forming a second subset of the plurality of independent localization sources of data comprising all sources of data, of the first subset, that provide data at a distance from the calculated location that is less than a predetermined distance from the calculated location;
   forming a set of all possible pairs of sources of data from the second subset of the plurality of independent localization sources of data and the calculated localization source of data;
   identifying all compatible pairs, in the set of all possible pairs, where the distance between the data provided by the localization sources of data in the pair is lower than a predetermined Compatibility Threshold;
   forming, based on the compatible pairs, a plurality of clusters of transitively compatible localization sources of data;
   identifying a largest cluster of the plurality of clusters; and
   after determining that the calculated localization source of data is not in the largest cluster, reducing the speed of the vehicle until the calculated localization source of data becomes part of the largest cluster.

2. The method of claim 1, further comprising increasing the first uncertainty for the calculated localization source of data until the calculated localization source of data becomes part of the largest cluster.

3. The method of claim 1, wherein the predetermined Reliability Threshold is dynamically adjusted based on environmental conditions around the vehicle.

4. The method of claim 1, wherein each localization source of data of the first subset is associated with a respective predetermined Reliability Threshold that corresponds to a type of the respective independent localization source of data.

5. The method of claim 4, wherein the predetermined Reliability Threshold is the same for at least two of the localization sources of data in the first subset.

6. A system for modifying the speed of a vehicle, the system comprising:
   a Vehicle Steering and Traction Actuator System;
   a plurality of independent localization sources of data;
   a calculator module configured to calculate, with a first uncertainty, a calculated location for the vehicle based on data from a subset of the plurality of independent localization sources of data; and
   a validation module configured to:
      form a first subset of the plurality of independent localization sources of data comprising all sources of data, of the plurality of independent localization sources of data, that provide data in a quantity and of a quality above a predetermined Reliability Threshold;
      form a second subset of the plurality of independent localization sources of data comprising all sources of data, of the first subset, that provide data at a distance from the calculated location that is less than a predetermined distance;
      form a set of all possible pairs of sources of data from the second subset of the plurality of independent localization sources of data and the calculated location;
      identify all compatible pairs, in the set of all possible pairs, where the distance between the data provided by the localization sources of data in the pair is lower than a predetermined Compatibility Threshold;
      form, based on the compatible pairs, a plurality of clusters of transitively compatible localization sources of data;
      identify a largest cluster of the plurality of clusters; and
      after determining that the calculated location is not in the largest cluster, send a command signal to the Vehicle Steering and Traction Actuator System to reduce the speed of the vehicle until the calculated location becomes part of the largest cluster.

7. The system of claim 6, further comprising a remote supervision system which is informed of a state of the command signal.

8. The system of claim 7, in which the remote supervision system controls the Vehicle Steering and Traction Actuator System based on the state of the command signal.

9. The system of claim 6, wherein the predetermined Reliability Threshold is dynamically adjusted based on environmental conditions around the vehicle.

10. The system of claim 6, wherein each localization source of data of the first subset is associated with a respective predetermined Reliability Threshold that corresponds to a type of the respective independent localization source of data.

11. The system of claim 10, in which the predetermined Reliability Threshold is the same for at least two of the localization sources of data in the first subset.

12. A method of modifying the speed of a vehicle equipped with a plurality of independent localization sources of data, wherein a calculated localization source of data provides a calculated location of the vehicle with a first uncertainty as a result of processing data from a subset of the plurality of independent localization sources of data, the method comprising the steps of:
   forming a subset of the plurality of independent localization sources of data comprising all sources of data, of the plurality of independent localization sources of data, that provide data in a quantity and of a quality above a predetermined Reliability Threshold;
   forming a set of all possible pairs of sources of data from the subset of the plurality of independent localization sources of data and the calculated localization source of data;
   identifying all compatible pairs, in the set of all possible pairs, where the distance between the data provided by the localization sources of data in the pair is lower than a predetermined Compatibility Threshold;
   forming, based on the compatible pairs, a plurality of clusters of transitively compatible localization sources of data;
   identifying a largest cluster of the plurality of clusters; and
   after determining that the calculated localization source of data is not in the largest cluster, reducing the speed of the vehicle until the calculated localization source of data becomes part of the largest cluster.

13. The method of claim 12, wherein the predetermined Reliability Threshold is dynamically adjusted based on environmental conditions around the vehicle.

\* \* \* \* \*